United States Patent Office 2,792,353
Patented May 14, 1957

2,792,353
PROCESS FOR BREAKING PETROLEUM EMULSIONS EMPLOYING CERTAIN POLYEPOXIDE-MODIFIED OXYALKYLATED PHENOL-ALDEHYDE RESINS

Melvin De Groote, University City, and Kwan-Ting Shen, Brentwood, Mo., assignors to Petrolite Corporation, Wilmington, Del., a corporation of Delaware No Drawing. Application April 20, 1953, Serial No. 349,972

20 Claims. (Cl. 252—331)

Our invention provides an economical and rapid process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification under the conditions just mentioned are of significant value in removing impurities, particularly inorganic salts, from pipeline oil.

The present invention is concerned with a process for breaking petroleum emulsions of the water-in-oil type characterized by subjecting the emulsion to the action of a demulsifier including synthetic hydrophile products obtained by the reaction of certain oxyalkylated phenol-aldehyde resins, hereinafter described in detail, with certain non-aryl hydrophile polyepoxides, also hereinafter described in detail.

The products previously described which are obtained by reaction between a polyepoxide and certain oxyalkylation derivatives are useful for various purposes including the resolution of petroleum emulsions of the water-in-oil type, are obtained from certain heat-stable resins, which, since they are heat-stable, are also susceptible to reaction in various ways to yield products other than oxyalkylation products, such as amine derivatives. Such amine derivatives may be obtained, for example, by subjecting the resins to reaction with ethylene imine, propylene imine, or similar imines rather than reaction with ethylene oxide, propylene oxide, etc. Comparable compounds are obtained by derivatives which, in addition to having the imine radical, have an ether linkage such as

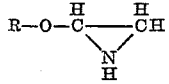

wherein R is a comparatively small acyl radical, such as methyl, ethyl, propyl, etc. The resultants obtained by reaction between the resinous materials and the imine type reactant exemplify new compounds having properties usually found in cationic surface-active agents and can be used for the purposes for which these materials are commonly employed. The materials so obtained are still susceptible to oxyalkylation with an alkylene oxide, such as ethylene oxide, propylene oxide, etc., and can be reacted with these oxides in the same manner as herein described in connection with the resinous materials which have not been subjected to the intermediate reaction with an imine.

Actually any reference in the claims or specification to the property of being "oxyalkylation-susceptible" might just as properly be characterized as being "imine-reactive" or for that matter as "oxyalkylation-susceptible" and "imine-reactive."

The products obtained by reaction between the oxyalkylated derivatives and the polyepoxides are obviously acylation-susceptible as well as being oxyalkylation-susceptible. For instance, they could be subjected to reaction with alkylene oxides different than those previously described, as for example, styrene oxide. These derivatives additionally must have a number of aliphatic hydroxyl groups. Such aliphatic hydroxyl groups as differentiated from phenolic hydroxyl groups present in one of the initial reactants are particularly susceptible to acylation with various carboxylic and non-carboxylic acids. They may be reacted with detergent-forming mono-carboxy acids, particularly higher fatty acids, which are saturated or unsaturated, as well as polycarboxy acids, such as phthalic anhydride, maleic anhydride, etc. Similarly, they can be reacted with maleic acid or a fractional maleic acid ester, such as the mono-octyl ester of maleic acid, and the neutral ester obtained can be reacted with sodium bisulfite so as to introduce a sulfonic group.

The present invention is characterized by the use of compounds derived from diglycidyl ethers which do not introduce any hydrophobe properties in its usual meaning but in fact are more apt to introduce hydrophile properties. Thus, the diepoxides employed in the present invention are characterized by the fact that the divalent radical connecting the terminal epoxide radicals contains less than 5 carbon atoms in an interrupted chain.

The diepoxides employed in the present process are obtained from glycols such as ethylene glycol, diethylene glycol, propylene glycol, dipropylene glycol, tripropylene glycol, butylene glycol, dibutylene glycol, tributylene glycol, glycerol, diglycerol, triglycerol, and similar compounds. Such products are well known and are characterized by the fact that there are not more than 4 uninterrupted carbon atoms in any group which is part of the radical joining the epoxide groups. Of necessity such diepoxides must be non-aryl or aliphatic in character. The diglycidyl ethers of our co-pending application, Serial No. 324,814, filed December 8, 1952, are invariably and inevitably aryl in character.

The diepoxides employed in the present process are usually obtained by reacting a glycol or equivalent compound, such as glycerol or diglycerol with epichlorohydrin and subsequently with an alkali. Such diepoxides have been described in the literature and particularly the patent literature. See, for example, Italian Patent 400,973, dated August 8, 1951; see also, British Patent 518,057, dated December 10, 1938; and U. S. Patent No. 2,070,990, dated February 16, 1937 to Groll et al. Reference is made also to U. S. Patent No. 2,581,464, dated January 8, 1952, to Zech. This particular last mentioned patent describes a composition of the following general formula:

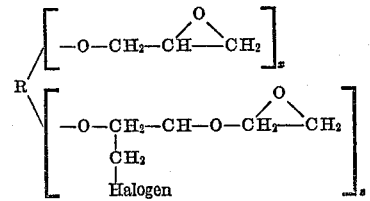

in which x is at least 1, z varies from less than 1 to more than 1, and x and z together are at least 2 and not more than 6, and R is the residue of the polyhydric alcohol remaining after replacement of at least 2 of the hydroxyl groups thereof with the epoxide ether groups of the above formula, and any remaining groups of the residue being free hydroxyl groups.

It is obvious from what is said in the patent that variance can be obtained in which the halogen is replaced by a hydroxyl radical; thus the formula would become

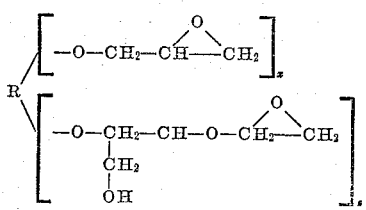

Reference to being thermoplastic characterizes them as being liquids at ordinary temperature or readily convertible to liquids by merely heating below the point of pyrolysis and thus differentiates them from infusible resins. Reference to being soluble in an organic solvent means any of the usual organic solvents such as alcohols, ketones, esters, ethers, mixed solvents, etc. Reference to solubility is merely to differentiate from a reactant which is not soluble and might be not only insoluble but also infusible. Furthermore, solubility is a factor insofar that it is sometimes desirable to dilute the compound containing the epoxy rings before reacting with a resin as described. In such instances, of course, the solvent selected would have to be one which is not susceptible to oxyalkylation, as, for example, kerosene, benzene, toluene dioxane, various ketones, chlorinated solvents, dibutyl ether, dihexyl ether, ethyleneglycol diethylether, diethyleneglycol diethylether, and dimethoxytetraethyleneglycol.

The expression "epoxy" is not usually limited to the 1,2-epoxy ring. The 1,2-epoxy ring is sometimes referred to as the oxirane ring to distinguish it from other epoxy rings. Hereinafter the word "epoxy" unless indicated otherwise, will be used to mean the oxirane ring i. e., the 1,2-epoxy ring. Furthermore, where a compound has two or more oxirane rings they will be referred to as polyepoxides. They usually represent, of course, 1,2-epoxide rings or oxirane rings in the alpha-omega position. This is a departure, of course, from the standpoint of strictly formal nomenclature as in the example of the simplest diepoxide which contains at least 4 carbon atoms and is formally described as 1,2-epoxy-3,4-epoxybutane (1,2,3,4 diepoxybutane).

It well may be that even though the previously suggested formula represents the principal component, or components, of the resultant or reaction product described in the previous text, it may be important to note that somewhat similar compounds, generally of much higher molecular weight, have been described as complex resinous epoxides which are polyether derivatives of polyhydric phenols containing an average of more than one epoxide group per molecule and free from functional groups other than epoxide and hydroxyl groups. See U. S. Patent No. 2,494,295, dated January 10, 1950, to Greenlee. The compounds here included are limited to the monomers or the low molal members of such series and generally contain two epoxide rings per molecule and may be entirely free from a hydroxyl group. This is important because the instant invention is directed toward products which are not insoluble resins and have certain solubility characteristics not inherent in the usual thermosetting resins. Simply for purpose of illustration to show a typical diglycidyl ether of the kind herein employed, reference is made to the following formula:

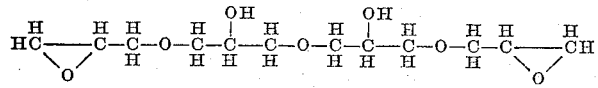

or if derived from cyclic diglycerol the structure would be thus:

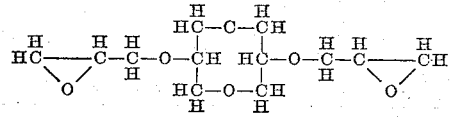

or the equivalent compound wherein the ring structure involves only six atoms thus:

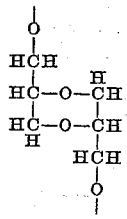

Commercially available compounds seem to be largely to the former with comparatively small amounts, in fact comparatively minor amounts, of the latter.

Having obtained a reactant having generally 2 epoxy rings as depicted in the next to last formula preceding, or low molal polymers thereof, it becomes obvious the reaction can take place with any oxyalkylated phenol-aldehyde resin by virtue of the fact that there are always present either phenolic hydroxyls or their alkanol radicals or the equivalent or alkanol radicals in the presence of any phenolic hydroxyl. Indeed, the products obtained by oxyalkylation of the phenolic resins must invariably and inevitably be oxyalkylation-susceptible.

To illustrate the products which are used in accordance with the present invention, reference will be made to a reaction involving a mole of the oxyalkylating agent, i. e., the compound having two oxirane rings and an oxyalkylated resin. Proceeding with the example previously described, it is obvious the reaction ratio of two moles of the oxyalkylated resin to one mole of the oxyalkylating agent gives a product which may be indicated as follows:

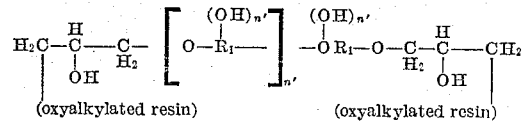

(oxyalkylated resin)    (oxyalkylated resin)

in which $n'$ is a small whole number less than 10, and usually less than 4, and including 0, $R_1$ represents a divalent radical as previously described being free from any radical having more than 4 uninterrupted carbon atoms in a single chain, and the characterization "oxyalkylated resin" is simply an abbreviation for the oxyalkylated resin which is described in greater detail subsequently.

Such products must be soluble in suitable solvents such as a non-oxygenated hydrocarbon solvent or an oxygenated hydrocarbon solvent or, for that matter, a mixture of the same with water. Needless to say, after the resin has been treated with a large amount of ethylene oxide, the products are water soluble and may be soluble in an acid solution.

The purpose in this instance is to differentiate from insoluble resinous materials, particularly those resulting from relation or cross-linking. Not only does this property serve to differentiate from instances where an insoluble material is desired, but also serves to emphasize the fact that in many instances the preferred compounds have distinct water-solubility or are distinctly soluble in 5% acetic acid. For instance, the products freed from any solvent can be shaken with five to twenty times their weight of distilled water at ordinary temperature and are at least self-dispersing, and in many instances water-soluble, in fact, colloidally soluble.

Basic nitrogen atoms can be introduced into such derivatives by use of a reactant having both a nitrogen group and a 1,2-epoxy group, such as 3-dialkylamino-epoxypropane. See U. S. Patent No. 2,520,093, dated August 22, 1950, to Gross.

As far as the use of the herein described products goes for the purpose of resolving petroleum emulsions of the water-in-oil type, and also for that matter for numerous other purposes where surface-active materials are effective, and particularly for those uses specified elsewhere herein, we prefer to employ oxyalkylated derivatives, which are obtained by the use of mono-epoxides, in such manner that the derivatives so obtained have sufficient hydrophile character to meet at least the test set forth in U. S. Patent No. 2,499,368, dated March 7, 1950, to De Groote et al. In said patent such test for emulsification using a water-insoluble solvent, generally xylene, is described as an index of surface activity.

In the present instance the various oxyalkylated derivatives obtained particularly by use of ethylene oxide, propylene oxide, etc., may not necessarily be xylene-soluble although they are xylene-soluble in a large number of instances. If such compounds are not xylene-soluble the obvious chemical equivalent, or equivalent chemical test, can be made by simply using some suitable solvent, preferably a water-soluble solvent such as ethylene glycol diethylether, or a low molal alcohol, or a mixture to dissolve the appropriate product being examined and then mix with the equal weight of xylene, followed by addition of water. Such test obviously is the same for the reason that there will be two phases on vigorous shaking and surface activity makes its presence manifest. It is understood the reference in the hereto appended claims as to the use of xylene in the emulsification test includes such obvious variant.

Another peculiarity of the compounds herein described is that they may pass into a comparatively high molecular weight range and be effective for various purposes, not only for the resolution of petroleum emulsions but also for other industrial uses described in detail elsewhere. This characteristic may be related to the fact that the initial resin molecule, obtained in turn from two resin molecules combined by means of a polyepoxide as described, results in a fairly large molecule.

As previously pointed out, we have found that we can obtain effective compounds for the herein described purposes where surface-active materials are employed, whether it be for the resolution of petroleum emulsions or other uses, in which the oxyalkylated derivatives subjected to reaction with a polyepoxide may represent roughly two parts of the initial resin and 98% of the alkylene oxide. The word, "oxyalkylated," is employed in this sense for the purpose of convenience in referring to the monoepoxide derivative only.

For purposes of convenience, what is said hereinafter will be divided into five parts:

Part 1 is concerned with the hydrophile nonaryl polyepoxides, and particularly diepoxides, employed as reactants.

Part 2 is concerned with suitable phenolaldehyde resins to be employed for reaction with the epoxides.

Part 3 is concerned with the oxyalkylation of the previously described phenol-aldehyde resins.

Part 4 is concerned with reactions involving the two preceding type of materials and examples obtained by such reaction. Generally speaking, this involves nothing more than a reaction between two moles of a previously prepared oxyalkylated phenol-aldehyde resin as described and one mole of a polyepoxide so as to yield a new and larger oxyalkylated resin molecule.

Part 5 is concerned with the resolution of petroleum emulsions of the water-in-oil type by means of the previously-described chemical compounds or reaction products.

PART 1

Reference is made to previous patents as illustrated in the manufacture of the non-aryl polyepoxides and particularly diepoxides employed as reactants in the instant invention. The simplest diepoxide is probably the one derived from 1,3-butadiene or isoprene. Such derivatives are obtained by the use of peroxides or by other suitable means and the diglycidyl ethers may be indicated thus:

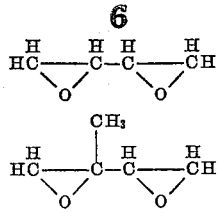

In some instances the compounds are essentially derivatives of etherized epichlorohydrin or methyl epichlorohydrin. Needless to say, such compounds can be derived from glycerol monochlorohydrin by etherization prior to ring closure. An example is illustrated in the previously mentioned Italian Patent No. 400,973:

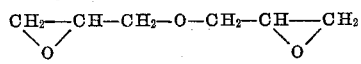

Another type of diepoxide is diisobutenyl dioxide as described in aforementioned U. S. Patent No. 2,070,990, dated February 16, 1937, to Groll, and is of the following formula:

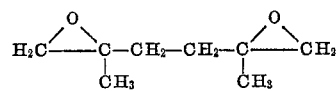

The diepoxides previously described may be indicated by the following formula:

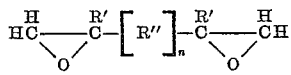

in which R' represents a hydrogen atom or methyl radical and R" represents the divalent radical uniting the two terminal epoxide groups, and $n'$ is the numeral 0 or 1. As previously pointed out, in the case of the butadiene derivative, $n'$ is 0. In the case of diisobutenyl dioxide R" is $CH_2CH_2$ and $n'$ is 1. In another example previously referred to R" is $CH_2OCH_2$ and $n'$ is 1.

However, for practical purposes the only diepoxide available in quantities other than laboratory quantities is a derivative of glycerol or epichlorohydrin. This particular diepoxide is obtained from diglycerol which is largely acyclic diglycerol, and epichlorohydrin or equivalent thereof, in that the epichlorohydrin itself may supply the glycerol or diglycerol radical in addition to the epoxy rings. As has been suggested previously, instead of starting with glycerol or a glycerol derivative, one could start with any one of a number of glycols or polyglycols and it is more convenient to include as part of the terminal oxirane ring radical the oxygen atom that was derived from epichlorohydrin or, as might be the case, methyl epichlorohydrin. So presented the formula becomes:

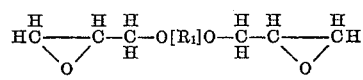

In the above formula $R_1$ is selected from groups such as the following:

$C_2H_4$
$C_2H_4OC_2H_4$
$C_2H_4OC_2H_4OC_2H_4$
$C_3H_6$
$C_3H_6OC_3H_6$
$C_3H_6OC_3H_6OC_3H_6$
$C_4H_8$
$C_4H_8OC_4H_8$
$C_4H_8OC_4H_8OC_4H_8$
$C_3H_5(OH)$
$C_3H_5(OH)OC_3H_5(OH)$
$C_3H_5(OH)OC_3H_5(OH)OC_3H_5(OH)$

It is to be noted that in the above epoxides there is a complete absence of (a) aryl radicals and (b) radicals in which 5 or more carbon atoms are united in a single uninterrupted single group. $R_1$ is inherently hydrophile in character as indicated by the fact that it is specified that the precursory diol or polyol HOROH must be water-soluble in substantially all proportions, i. e., water miscible.

Stated another way, what is said previously means that a polyepoxide such as

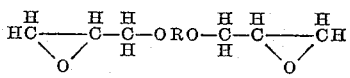

is derived actually or theoretically, or at least derivable, from the diol HOROH, in which the oxygen-linked hydrogen atoms were replaced by

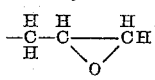

Thus, R(OH)$_n$, where $n$ represents a small whole number which is 2 or more, must be water-soluble. Such limitation excludes polyepoxides if actually derived, or theoretically derived at least, from water-insoluble diols or water-insoluble diols or water-insoluble triols or higher polyols. Suitable polyols may contain as many as 12 to 20 carbon atoms or thereabouts.

Referring to a compound of the type above in the formula

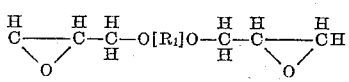

in which R$_1$ is C$_3$H$_5$(OH), it is obvious that reaction with another mole of epichlorohydrin with appropriate ring closure would produce a triepoxide or, similarly, if R happened to be C$_3$H$_5$(OH)OC$_3$H$_5$(OH), one could obtain a tetraepoxide. Actually, such procedure generally yields triepoxides, or mixtures with higher epoxides and perhaps in other instances mixtures in which diepoxides are also present. Our preference is to use the diepoxides.

There is available commercially at least one diglycidyl ether free from aryl groups and also free from any radical having 5 or more carbon atoms in an uninterrupted chain. This particular diglycidyl ether is obtained by the use of epichlorohydrin in such a manner that approximately 4 moles of epichlorohydrin yield one mole of the diglycidyl ether, or, stated another way, it can be considered as being formed from one mole of diglycerol and 2 moles of epichlorohydrin so as to give the appropriate diepoxide. The molecular weight is approximately 370 and the number of epoxide groups per molecule are approximately 2. For this reason in the first of a series of subsequent examples this particular diglycidyl ether is used, although obviously any of the others previously described would be just as suitable. For convenience, this diepoxide will be referred to as diglycidyl ether A. Such material corresponds in a general way to the previous formula.

Using laboratory procedure we have reacted diethyleneglycol with epichlorohydrin and subsequently with alkali so as to produce a product which, on examination, corresponded approximately to the following compound:

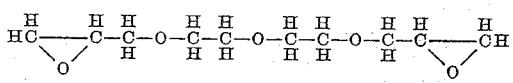

The molecular weight of the product was assumed to be 230 and the product was available in laboratory quantities only. For this reason, the subsequent table referring to the use of this particular diepoxide, which will be referred to as diglycidyl ether B, is in grams instead of pounds.

Probably the simplest terminology for these polyepoxides, and particularly diepoxides, to differentiate from comparable aryl compounds, is to use the terminology "epoxyalkanes" and, more particularly, polyepoxyalkanes or diepoxyalkanes. The difficulty is that the majority of these compounds represent types in which a carbon atom chain is interrupted by an oxygen atom and, thus, they are not strictly alkane derivatives. Furthermore, they may be hydroxylated or represent a hetero-cyclic ring. The principal class properly may be referred to as polyepoxypolyglycerols, or diepoxypolyglycerols.

Other examples of diepoxides involving a heterocyclic ring having, for example, 3 carbon atoms and 2 oxygen atoms, are obtainable by the conventional reaction of combining erythritol with a carbonyl compound, such as formaldehyde or acetone so as to form the 5-membered ring, followed by conversion of the terminal hydroxyl groups into epoxy radicals.

PART 2

This part is concerned with the preparation of phenol-aldehyde resins of the kind described in detail in U. S. Patent No. 2,499,370, dated March 7, 1950, to De Groote and Keiser, with the following qualifications: said aforementioned patent is limited to resins obtained from difunctional phenols having 4 to 12 carbon atoms in the substituent hydrocarbon radical. For the present purpose the substituent may have as many as 18 carbon atoms, as in the case of resins prepared from tetradecylphenol, substantially para-tetradecylphenol, commercially available. Similarly, resins can be prepared from hexadecylphenol or octadecylphenol. This feature will be referred to subsequently.

In addition to U. S. Patent No. 2,499,370, reference is made also to the following U. S. Patents: Nos. 2,499,365; 2,499,366; and 2,499,367, all dated March 7, 1950, to De Groote and Keiser. These patents, along with the other two previously mentioned patents, describe phenolic resins of the kind herein employed as initial materials.

For practical purposes, the resins having 4 to 12 carbon atoms are most satisfactory, with the additional C$_{14}$ carbon atom also being very satisfactory. The increased cost of the C$_{16}$ and C$_{18}$ carbon atom phenol renders these raw materials of less importance, at least at the present time.

Patent 2,499,370 describes in detail methods of preparing resins useful as intermediates for preparing the products of the present application, and reference is made to that patent for such detailed description and to Examples 1a through 103a of that patent for examples of suitable resins.

As previously noted, the hydrocarbon substituent in the phenol may have as many as 18 carbon atoms, as illustrated by tetradecylphenol, hexadecylphenol and octadecylphenol, reference in each instance being to the difunctional phenol, such as the ortho- or para-substituted phenol or a mixture of the same. Such resins are described also in issued patents, for instance, U. S. Patent No. 2,499,365, dated March 7, 1950, to De Groote and Keiser, such as Example 71a.

It is sometimes desirable to present the resins herein employed in an over-simplified form which has appeared from time to time in the literature, and particularly in the patent literature, for instance, it has been stated that the composition is approximaed in an idealized form by the formula

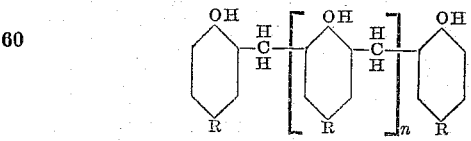

in the above formula $n$ represents a small whole number varying from 1 to 6, 7 or 8, or more, up to probably 10 or 12 units, particularly when the resin is subjected to heating under a vacuum as described in the literature. A limited sub-genus is in the instance of low molecular weight polymers where the total number of phenol nuclei varies from 3 to 6, i. e., $n$ varies from 1 to 4; R represents an aliphatic hydrocarbon substituent, generally an alkyl radical having from 4 to 14 carbon atoms, such as butyl, amyl, hexyl, decyl or dodecyl radical. Where the divalent bridge radical is shown as being derived from formaldehyde, it may, of course, be derived from any other reactive aldehyde having 8 carbon atoms or less.

In the above formula the aldehyde employed in the resin manufacture is formaldehyde. Actually, some other aldehyde such as acetaldehyde, propionaldehyde, or butyraldehyde may be used. The resin unit can be exemplified thus:

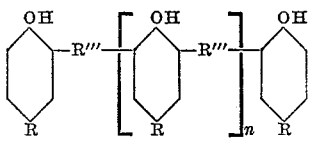

in which R''' is the divalent radical obtained from the particular aldehyde employed to form the resin.

Resins can be made using an acid catalyst or basic catalyst or a catalyst showing neither acid nor basic properties in the ordinary sense or without any catalyst at all. It is preferable that the resins employed be substantially neutral. In other words, if prepared by using a strong acid as a catalyst, such strong acid should be neutralized. Similarly, if a strong base is used as a catalyst it is preferable that the base be neutralized although we have found that sometimes the reaction described proceeded more rapidly in the presence of a small amount of a free base. The amount may be as small as a 200th of a percent and as much as a few 100th of a percent. Sometimes moderate increase in caustic soda and caustic potash may be used. However, the most desirable procedure in practically every case is to have the resin neutral.

In preparing resins one does not get a single polymer, i. e., one having just 3 units, or just 4 units, or just 5 units, or just 6 units, etc. It is usually a mixture; for instance, one approximating 4 phenolic nuclei will have some trimer and pentamer present. Thus, the molecular weight may be such that it corresponds to a fractional value for $n$ as, for example, 3.5; 4.5; or 5.2.

In the actual manufacture of the resins we found no reason for using other than those which are lowest in price and most readily available commercially. For purpose of convenience suitable resins are characterized in the following table:

TABLE I

| Example number | R | Position of R | R''' derived from | $n$ | Mol. wt. of resin molecule (based on $n+2$) |
|---|---|---|---|---|---|
| 1a | Phenyl | Para | Formaldehyde | 3.5 | 992.5 |
| 2a | Tertiary butyl | do | do | 3.5 | 882.5 |
| 3a | Secondary butyl | Ortho | do | 3.5 | 882.5 |
| 4a | Cyclo-hexyl | Para | do | 3.5 | 1,025.5 |
| 5a | Tertiary amyl | do | do | 3.5 | 959.5 |
| 6a | Mixed secondary and tertiary amyl | Ortho | do | 3.5 | 805.5 |
| 7a | Propyl | Para | do | 3.5 | 805.5 |
| 8a | Tertiary hexyl | do | do | 3.5 | 1,036.5 |
| 9a | Octyl | do | do | 3.5 | 1,190.5 |
| 10a | Nonyl | do | do | 3.5 | 1,267.5 |
| 11a | Decyl | do | do | 3.5 | 1,344.5 |
| 12a | Dodecyl | do | do | 3.5 | 1,498.5 |
| 13a | Tertiary butyl | do | do | Acetaldehyde | 3.5 | 945.5 |
| 14a | Tertiary amyl | do | do | 3.5 | 1,022.5 |
| 15a | Nonyl | do | do | 3.5 | 1,330.5 |
| 16a | Tertiary butyl | do | Butyraldehyde | 3.5 | 1,071.5 |
| 17a | Tertiary amyl | do | do | 3.5 | 1,148.5 |
| 18a | Nonyl | do | do | 3.5 | 1,456.5 |
| 19a | Tertiary butyl | do | Propionaldehyde | 3.5 | 1,008.5 |
| 20a | Tertiary amyl | do | do | 3.5 | 1,085.5 |
| 21a | Nonyl | do | do | 3.5 | 1,393.5 |
| 22a | Tertiary butyl | do | Formaldehyde | 4.2 | 996.6 |
| 23a | Tertiary amyl | do | do | 4.2 | 1,083.4 |
| 24a | Nonyl | do | do | 4.2 | 1,430.6 |
| 25a | Tertiary butyl | do | do | 4.8 | 1,094.4 |
| 26a | Tertiary amyl | do | do | 4.8 | 1,189.6 |
| 27a | Nonyl | do | do | 4.8 | 1,570.4 |
| 28a | Tertiary amyl | do | do | 1.5 | 604.0 |
| 29a | Cyclo-hexyl | do | do | 1.5 | 646.0 |
| 30a | Hexyl | do | do | 1.5 | 653.0 |
| 31a | do | do | Acetaldehyde | 1.5 | 688.0 |
| 32a | Octyl | do | do | 1.5 | 786.0 |

TABLE I—Continued

| Example number | R | Position of R | R''' derived from | $n$ | Mol. wt. of resin molecule (based on $n+2$) |
|---|---|---|---|---|---|
| 33a | Nonyl | Para | Acetaldehyde | 1.5 | 835.0 |
| 34a | Octyl | do | Butyraldehyde | 2.0 | 986.0 |
| 35a | Nonyl | do | do | 2.0 | 1,028.0 |
| 36a | Amyl | do | do | 2.0 | 860.0 |
| 37a | Butyl | do | Formaldehyde | 2.0 | 636.0 |
| 38a | Amyl | do | do | 2.0 | 692.0 |
| 39a | Hexyl | do | do | 2.0 | 748.0 |
| 40a | Cyclo-hexyl | do | do | 2.0 | 740.0 |

PART 3

There have been issued a substantial number of patents which give detailed description of the preparation of oxyalkylated derivatives of resins of the kind previously described. For example, see U. S. Patents 2,499,365; 2,499,366; 2,499,367; 2,499,368; and 2,499,370, all dated March 7, 1950 to De Groote and Keiser.

More specifically, a number of other patents have appeared in which the oxyethylation step is given with considerable detail. See, for example, U. S. Patents 2,581,376; 2,581,377; 2,581,378; 2,581,379; 2,581,380; and 2,581,381, all dated January 8, 1952, to De Groote and Keiser. As to further examples, see U. S. Patent 2,602,052, dated July 1, 1952, to De Groote.

The oxypropylation or, for that matter, the treatment of resins with butylene oxide, glycide, or methyl glycide, has been described in the first of the series in the above mentioned patents, i. e., those issued in 1950.

Reference is made to U. S. Patent 2,557,081, dated June 19, 1951, to De Groote and Keiser. This particular patent describes in considerable detail resins which are first treated with propylene oxide and then with ethylene oxide or with ethylene oxide and then propylene oxide or with both oxides simultaneously.

In order to avoid an extensive repetition of what is already described in detail in the patent literature, we are referring to the tables beginning in column 21 of U. S. Patent 2,581,376 and extending through column 36. We have simply numbered these products beginning with 1b, allotting, of course, five numbers to each table beginning with the first table. For convenience these sixteen tables are summarized in the following table:

TABLE II

| Ex. No. | Phenol | Aldehyde | Solvent, lbs. | Resin, lbs. | Ethylene oxide, lbs. |
|---|---|---|---|---|---|
| 1b | Para-tertiary amyl | Formaldehyde | 14.25 | 15.75 | 4.00 |
| 2b | do | do | 10.90 | 12.10 | 15.25 |
| 3b | do | do | 7.13 | 7.93 | 19.69 |
| 4b | do | do | 3.84 | 4.25 | 16.15 |
| 5b | do | do | 1.80 | 2.04 | 10.20 |
| 6b | Nonyl | do | 15.00 | 15.00 | 3.00 |
| 7b | do | do | 10.00 | 10.00 | 9.40 |
| 8b | do | do | 7.27 | 7.27 | 13.70 |
| 9b | do | do | 3.15 | 3.15 | 8.95 |
| 10b | do | do | 2.10 | 2.10 | 8.00 |
| 11b | Para-octyl | do | 14.20 | 15.80 | 3.25 |
| 12b | do | do | 11.10 | 12.40 | 12.50 |
| 13b | do | do | 6.64 | 7.36 | 15.00 |
| 14b | do | do | 4.40 | 4.90 | 14.80 |
| 15b | do | do | 4.10 | 4.58 | 18.52 |
| 16b | Menthyl | do | 13.65 | 16.35 | 3.00 |
| 17b | do | do | 10.00 | 12.00 | 10.75 |
| 18b | do | do | 5.48 | 6.58 | 10.85 |
| 19b | do | do | 4.10 | 4.90 | 13.15 |
| 20b | do | do | 3.10 | 3.72 | 13.43 |
| 21b | Para-secondary butyl | do | 14.45 | 15.55 | 4.25 |
| 22b | do | do | 8.48 | 9.17 | 16.00 |
| 23b | do | do | 4.82 | 5.18 | 14.25 |
| 24b | do | do | 3.85 | 4.15 | 17.00 |
| 25b | do | do | 2.65 | 2.85 | 15.45 |
| 26b | Menthyl | Propionaldehyde | 12.80 | 17.20 | 2.75 |
| 27b | do | do | 8.55 | 11.50 | 9.30 |
| 28b | do | do | 3.77 | 5.08 | 13.10 |
| 29b | do | do | 15.20 | 7.00 | 17.00 |
| 30b | do | do | 2.10 | 2.83 | 9.12 |

TABLE II—Continued

| Ex. No. | Phenol | Aldehyde | Solvent, lbs. | Resin, lbs. | Ethylene oxide, lbs. |
|---|---|---|---|---|---|
| 31b | Para-tertiary amyl | Furfural | 11.20 | 18.00 | 3.50 |
| 32b | ----do---- | ----do---- | 8.45 | 13.60 | 12.65 |
| 33b | ----do---- | ----do---- | 4.50 | 8.00 | 14.50 |
| 34b | ----do---- | ----do---- | 3.42 | 5.48 | 15.10 |
| 35b | ----do---- | ----do---- | 2.05 | 3.65 | 13.35 |
| 36b | Menthyl | ----do---- | 10.25 | 17.75 | 2.50 |
| 37b | ----do---- | ----do---- | 7.60 | 13.15 | 9.35 |
| 38b | ----do---- | ----do---- | 4.22 | 6.98 | 10.00 |
| 39b | ----do---- | ----do---- | 3.76 | 6.24 | 13.25 |
| 40b | ----do---- | ----do---- | 2.40 | 4.15 | 11.70 |
| 41b | Para-octyl | ----do---- | 12.10 | 18.60 | 3.00 |
| 42b | ----do---- | ----do---- | 9.25 | 14.25 | 11.00 |
| 43b | ----do---- | ----do---- | 6.72 | 10.32 | 14.91 |
| 44b | ----do---- | ----do---- | 5.52 | 8.52 | 19.81 |
| 45b | ----do---- | ----do---- | 1.75 | 2.70 | 8.40 |
| 46b | Para-phenyl | ----do---- | 13.90 | 16.70 | 3.00 |
| 47b | ----do---- | ----do---- | 10.35 | 12.45 | 12.20 |
| 48b | ----do---- | ----do---- | 8.90 | 10.70 | 19.00 |
| 49b | ----do---- | ----do---- | 5.20 | 6.26 | 16.64 |
| 50b | ----do---- | ----do---- | 3.60 | 4.32 | 15.68 |
| 51b | Para-secondary nonyl | ----do---- | 10.85 | 20.75 | 3.00 |
| 52b | ----do---- | ----do---- | 8.28 | 15.85 | 11.77 |
| 53b | ----do---- | ----do---- | 5.95 | 11.25 | 16.75 |
| 54b | ----do---- | ----do---- | 4.46 | 8.52 | 19.07 |
| 55b | ----do---- | ----do---- | 2.57 | 4.93 | 14.50 |
| 56b | | | | | |
| 57b | Para-phenyl | Formaldehyde | 11.00 | 9.00 | 11.75 |
| 58b | | | | | |
| 59b | | | | | |
| 60b | Para-phenyl | | 3.41 | 2.80 | 13.64 |
| 61b | Para-secondary butyl | Furfural | 12.00 | 17.90 | 3.50 |
| 62b | ----do---- | ----do---- | 9.35 | 13.92 | 13.23 |
| 63b | ----do---- | ----do---- | 6.25 | 8.95 | 17.00 |
| 64b | ----do---- | ----do---- | 4.35 | 6.50 | 18.40 |
| 65b | ----do---- | ----do---- | 3.02 | 4.34 | 16.49 |
| 66b | Para-octyl | Propionaldehyde | 13.30 | 16.90 | 3.00 |
| 67b | ----do---- | ----do---- | 10.20 | 12.90 | 11.30 |
| 68b | ----do---- | ----do---- | 6.46 | 8.24 | 16.50 |
| 69b | ----do---- | ----do---- | 3.86 | 4.87 | 13.02 |
| 70b | ----do---- | ----do---- | 2.94 | 3.75 | 13.26 |
| 71b | Para-nonyl | ----do---- | 10.90 | 18.00 | 3.00 |
| 72b | ----do---- | ----do---- | 8.25 | 13.60 | 11.50 |
| 73b | ----do---- | ----do---- | 5.65 | 9.35 | 15.75 |
| 74b | ----do---- | ----do---- | 3.15 | 5.25 | 13.45 |
| 75b | ----do---- | ----do---- | 1.94 | 3.21 | 10.65 |
| 76b | Para-tertiary amyl | ----do---- | 12.60 | 16.20 | 3.50 |
| 77b | ----do---- | ----do---- | 9.52 | 12.24 | 12.89 |
| 78b | ----do---- | ----do---- | 6.50 | 8.30 | 17.75 |
| 79b | ----do---- | ----do---- | 4.25 | 5.45 | 17.25 |
| 80b | ----do---- | ----do---- | 2.69 | 3.43 | 14.55 |

NOTE.—For ease of comparison blanks appear in the above table where blanks appear in previously mentioned tables in U. S. Patent 2,581,376.

Oxypropylated derivatives comparable to 1b through 80b as described above can readily be obtained by substituting a molar equivalent amount of propylene oxide, i. e., 56 lbs. of propylene oxide, for example, for each 44 lbs. of ethylene oxide. We have prepared such a similar series but for sake of brevity only a few will be included for purposes of illustration.

TABLE III

| Ex. No. | Oxypropylated analog | Phenol | Aldehyde | Solvent, lbs. | Resin, lbs. | Propylene oxide, lbs. |
|---|---|---|---|---|---|---|
| 1c | 1b | Para-tertiary amyl | Formaldehyde | 14.25 | 15.75 | 5.10 |
| 2c | 2b | ----do---- | ----do---- | 10.90 | 12.10 | 19.40 |
| 3c | 3b | ----do---- | ----do---- | 7.13 | 7.93 | 25.30 |
| 4c | 4b | ----do---- | ----do---- | 3.84 | 4.25 | 23.00 |
| 5c | 5b | ----do---- | ----do---- | 1.80 | 2.04 | 13.00 |
| 66c | 66b | Para-octyl | Propionaldehyde | 13.30 | 16.90 | 3.82 |
| 67c | 67b | ----do---- | ----do---- | 10.20 | 12.90 | 14.40 |
| 68c | 68b | ----do---- | ----do---- | 6.46 | 8.24 | 21.00 |
| 69c | 69b | ----do---- | ----do---- | 3.86 | 4.87 | 16.60 |
| 70c | 70b | ----do---- | ----do---- | 2.94 | 3.75 | 16.80 |
| 76c | 76b | Para-tertiary amyl | Formaldehyde | 12.60 | 16.20 | 4.46 |
| 77c | 77b | ----do---- | ----do---- | 9.52 | 12.24 | 16.45 |
| 78c | 78b | ----do---- | ----do---- | 6.50 | 8.30 | 22.60 |
| 79c | 79b | ----do---- | ----do---- | 4.25 | 5.45 | 22.00 |
| 80c | 80b | ----do---- | ----do---- | 2.69 | 3.43 | 13.55 |

As an illustration of oxypropylated resins involving the use of both ethylene and propylene oxide, a reference is made to the aforementioned U. S. Patent 2,557,081, dated June 19, 1951, to De Groote and Keiser. The last table in column 28 of said patent describes in detail the preparation of a series of oxyalkylated resins in which both propylene and ethylene oxide are employed. Simply by illustration, a series of 27 compounds are included, the description of which appears in detail in said aforementioned U. S. Patent 2,577,081, to De Groote and Keiser.

TABLE IV

| Ex. No. | See U. S. Pat. 2,557,081 | | Resin used | Resin, lbs. | Ethylene oxide, lbs. | Propylene oxide, lbs. | Wt. of xylene | Flake caustic soda, ounces |
|---|---|---|---|---|---|---|---|---|
| | Ex. No. in above patent | Point on graph on above patent | | | | | | |
| 1d | A | 1 | Tert. amyl phenol formaldehyde. | 6 | 3 | 1 | 10 | 1 |
| 2d | B | 5 | ----do---- | 5 | 4 | 1 | 10 | 1 |
| 3d | C | 8 | ----do---- | 3 | 6 | 1 | 10 | 1 |
| 4d | D | 2 | ----do---- | 1 | 21.5 | 2.5 | 25 | 2 |
| 5d | E | 9 | ----do---- | 1 | 15 | 9 | 25 | 2 |
| 6d | F | 6 | ----do---- | 1 | 10 | 15 | 25 | 2 |
| 7d | G | 3 | ----do---- | 1 | 2.5 | 21.5 | 25 | 2 |
| 8d | H | 7 | ----do---- | 5 | 1 | 4 | 10 | 1 |
| 9d | I | 4 | ----do---- | 6 | 1 | 3 | 10 | 1 |
| 10d | A | 1 | Tert. butyl phenol formaldehyde. | 6 | 3 | 1 | 10 | 1 |
| 11d | B | 5 | ----do---- | 5 | 4 | 1 | 10 | 1 |
| 12d | C | 8 | ----do---- | 3 | 6 | 1 | 10 | 1 |
| 13d | D | 2 | ----do---- | 1 | 21.5 | 2.5 | 25 | 2 |
| 14d | E | 9 | ----do---- | 1 | 15 | 9 | 25 | 2 |
| 15d | F | 6 | ----do---- | 1 | 10 | 14 | 25 | 2 |
| 16d | G | 3 | ----do---- | 1 | 2.5 | 21.5 | 25 | 2 |
| 17d | H | 7 | ----do---- | 5 | 1 | 4 | 10 | 1 |
| 18d | I | 4 | ----do---- | 6 | 1 | 3 | 10 | 1 |
| 19d | A | 1 | Nonyl phenol-formaldehyde. | 6 | 3 | 1 | 10 | 1 |
| 20d | B | 5 | ----do---- | 5 | 4 | 1 | 10 | 1 |
| 21d | C | 8 | ----do---- | 3 | 6 | 1 | 10 | 1 |
| 22d | D | 2 | ----do---- | 1 | 21.5 | 2.5 | 25 | 2 |
| 23d | E | 9 | ----do---- | 1 | 15 | 9 | 25 | 2 |
| 24d | F | 6 | ----do---- | 1 | 10 | 14 | 25 | 2 |
| 25d | G | 3 | ----do---- | 1 | 2.5 | 21.5 | 25 | 2 |
| 26d | H | 7 | ----do---- | 5 | 1 | 4 | 10 | 1 |
| 27d | I | 4 | ----do---- | 6 | 1 | 3 | 10 | 1 |

Note the first series of nine compounds, 1d through 9d were prepared with propylene oxide, first and then ethylene oxide. The second nine compounds, 10d through 18d inclusive, were prepared using ethylene oxide first and then propylene oxide, and the last nine compounds, 19d through 27d, were prepared by random oxyalkylation, i. e., using a mixture of the two oxides.

In the preparation of the resins, our preference is to use hydrocarbon substituted phenols, particularly para-substituted, in which the substituted radical R contains 4 to 18 carbon atoms and particularly 4 to 14 carbon atoms. The amount of alkylene oxide introduced may be comparatively large in comparison to the initial resin. For instance, there may be as much as 50 parts by weight of an oxide or mixed oxides used for each part by weight of resin employed.

It will be noted that the various resins referred to in the aforementioned U. S. Patent 2,499,370 are substantially the same type of materials as referred to in Table I. For instance, resin 3a of the table is substantially the same as 2a of the patent; resin 20a of the table is substantially the same as 34a of the patent; and resin 38a of the table is the same as 3a of the patent.

In reaction with polyepoxides, and particularly diepoxides, a large number of the previously described oxyalkylated resins have been employed. For instance, the following list is selected indicating the previously described compounds and their molecular weights. Such resins are generally employed as a 50% solution and the polyepoxide employed is a 50% solution, usually both reactants being dissolved in xylene and sufficient sodium methylate added to act as a catalyst, for instance, 1 to 2%.

TABLE V

| Example number | Molecular weight |
| --- | --- |
| 1b | 1,202 |
| 2b | 2,169 |
| 3b | 3,339 |
| 4b | 4,609 |
| 5b | 5,749 |
| 6b | 1,509 |
| 7b | 2,466 |
| 8b | 3,657 |
| 9b | 5,867 |
| 10b | 6,087 |
| 1c | 1,270 |
| 2c | 2,494 |
| 3c | 4,019 |
| 4c | 6,139 |
| 5c | 7,079 |
| 1d | 1,697 |
| 2d | 1,918 |
| 3d | 3,189 |
| 4d | 23,959 |
| 5d | 23,959 |
| 6d | 24,909 |
| 7d | 23,959 |
| 8d | 1,918 |
| 9d | 1,697 |

PART 4

As previously stated, the final stage reactions involve two moles of an oxyalkylated phenol-aldehyde resin of the kind previously described and one mole of a diglycidyl ether as specified. The reaction is essentially an oxyalkylation reaction and thus may be considered as merely a continuance of the previous oxyalkylation reaction involving a monoepoxide as differentiated from a polyepoxide and particularly a diepoxide. The reactions take place in substantially the same way, i. e., by the opportunity to react at somewhere above the boiling point of water and below the point of decomposition, for example, 130–185° C. in the presence of a small amount of alkaline catalyst. Since the polyepoxide is non-volatile as compared, for example, with ethylene oxide, the reaction is comparatively simple. Purely from a mechanical standpoint it is a matter of convenience to conduct both classes of reactions in the same equipment. In other words, after the phenol-aldehyde resin has been reacted with ethylene oxide, propylene oxide or the like, it is subsequently reacted with a polyepoxide. The polyepoxide reaction can be conducted in an ordinary reaction vessel such as the usual glass laboratory equipment. This is particularly true of the kind used for resin manufacture as described in a number of patents, as for example, U. S. Patent No. 2,499,365. One can use a variety of catalysts in connection with the polyepoxide of the same class employed with monoepoxide. In fact, the reaction will go at an extremely slow rate without any catalyst at all. The usual catalyst include alkaline materials such as caustic soda, caustic potash, sodium methylate, etc. Other catalysts may be acidic in nature and are of the kind characterized by iron and tin chlorides. Furthermore, insoluble catalysts such as clays or specially prepared mineral catalysts have been used. For practical purposes, it is best to use the same catalyst as is used in the initial oxyalkylation step and in many cases there is sufficient residual catalyst to serve for the reaction involving the second oxyalkylation step, i. e., the polyepoxide. For this reason, we have preferred to use a small amount of finely divided caustic soda or sodium methylate as the initial catalyst and also the catalyst in the second stage. The amount generally employed is 1, 2 or 3% of these alkaline catalysts.

Actually, the reactions of polyepoxides with various resin materials have been thoroughly described in the literature and the procedure is, for all purposes, the same as with glycide which has been described previously.

It goes without saying that the reaction involving the polyepoxide can be conducted in the same manner as the monoepoxide as far as the presence of an inert solvent is concerned, i. e., one that is not oxyalkylation-susceptible. Generally speaking, this is most conveniently an aromatic solvent such as xylene or a higher boiling coal tar solvent, or else a similar high boiling aromatic solvent obtained from petroleum. One can employ an oxygenated solvent such as the diethylether of ethylene glycol, or the diethylether of propylene glycol, or similar ethers, either alone or in combination with a hydrocarbon solvent. The solvent so selected should be one which, of course, is suitable in the oxyalkylation step involving the monoepoxides described subsequently. The solvent selected may depend on the ability to remove it by subsequent distillation if required. Here again it has been our preference to have a solvent present in the oxyalkylation involving the initial stage and permitting the solvent to remain. The amount of solvent may be insignificant, depending whether or not exhaustive oxypropylation is employed. However, since the oxypropylated phenol-aldehyde resins are almost invariably liquids there is no need for the presence of a solvent as when oxyalkylation involves a solid which may be rather high melting. Thus, it is immaterial whether there is solvent present or not and it is immaterial whether solvent was added in the first stage of oxyalkylation or not, and also it is immaterial whether there was solvent present in the second stage of oxyalkylation or not. The advantage of the presence of solvent is that sometimes it is a convenient way of controlling the reaction temperature and thus in the subsequent examples we have added sufficient xylene so as to produce a mixture which boils somewhere in the neighborhood of 125° to 140° C. and remove xylene so as to bring the boiling point of the mixture to about 140° C. during part of the reaction and subsequently removing more xylene so that the mixture refluxed at somewhere between 170° to 190° C. This was purely a convenience and need not be employed unless desired.

*Example 1e*

The oxyalkylated resin employed was the one previously identified as 2b, having a molecular weight of 2169; the amount employed was 217 grams. The resin was dissolved in approximately an equal weight of xylene. The mixture was heated to just short of the boiling point of water, i. e., a little below 100° C. Approximately one half percent of sodium methylate was added, or, more exactly, 1.1 grams. The stirring was continued until there was a solution or distribution of the catalyst. The mixture was heated to a little past 100° C. and left at this temperature while 18.5 grams of the diepoxide (previously identified as A), dissolved in an equal weight of xylene, were added. After the diepoxide was added the temperature was permitted to rise to approximately 109° C. The time required to add the diepoxide was approximately one-half hour. The temperature rose in this period to about 127° C. The temperature rise was controlled by allowing the xylene to reflux over and to separate out the xylene by a phase separating trap. In any event, the temperature was raised shortly to 148–150° C. and allowed to reflux at this temperature for almost three hours. Tests indicated that the reaction was complete at the end of this time; in fact, it probably was complete at a considerably earlier stage. The xylene which had been separated out was returned to the mixture so that the reaction mass at the end of the procedure represented about 50% reaction product and 50% solvent. The procedure employed is, of course, simple in light of what has been said previously; in fact, it corresponds to the usual procedure employed in connection with an oxyalkylating agent such as glycide, i. e., a non-volatile oxyalkylating agent. At the end of the reaction period the mass obtained was a dark, viscous mixture. It could be bleached, of course, by use of charcoal, filtering earths, or the like.

Various examples obtained in substantially the same manner as employed are described in the following tables:

PART 5

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil-solubility. However, since such reagents are frequently used in a ratio of 1 to 10,000 or 1 to 20,000, or 1 to 30,000, or even 1 to 40,000, or 1 to 50,000 as in desalting practice, such an apparent insolubility in oil and water is not significant because said reagents undoubtedly have solubility within such concentrations. This same fact is true in regard to the material or materials employed as the demulsifying agent of our process.

In practicing the present process, the treating or de-

TABLE VI

| Ex. No. | Oxyalkylated resin | Amt., gms. | Diepoxide used | Amt., gms. | Catalyst (NaOCH₃), grams | Xylene, gms. | Molar ratio | Time of reaction, hrs. | Max. temp., °C. | Color and physical state |
|---|---|---|---|---|---|---|---|---|---|---|
| 1c | 2b | 217 | A | 18.5 | 1.1 | 235.5 | 2:1 | 3 | 150 | Dark, viscous mass. |
| 2c | 4b | 460 | A | 18.5 | 2.3 | 478.5 | 2:1 | 4 | 155 | Do. |
| 3c | 7b | 247 | A | 18.5 | 1.3 | 265.5 | 2:1 | 3 | 152 | Do. |
| 4c | 10b | 609 | A | 18.5 | 3.1 | 627.5 | 2:1 | 5 | 158 | Do. |
| 5c | 2c | 249 | A | 18.5 | 1.3 | 267.5 | 2:1 | 3 | 145 | Do. |
| 6c | 3c | 402 | A | 18.5 | 2.1 | 420.5 | 2:1 | 4 | 150 | Do. |
| 7c | 5c | 708 | A | 18.5 | 3.6 | 726.5 | 2:1 | 5 | 156 | Do. |
| 8c | 2d | 192 | A | 18.5 | 1.0 | 210.5 | 2:1 | 3 | 150 | Do. |
| 9c | 3d | 319 | A | 18.5 | 1.6 | 337.5 | 2:1 | 3 | 152 | Do. |
| 10c | 6d | 249 | A | 1.9 | 1.2 | 251.0 | 2:1 | 3 | 155 | Do. |
| 1d | 2b | 217 | B | 11.0 | 1.1 | 228.0 | 2:1 | 3 | 148 | Do. |
| 2d | 4b | 460 | B | 11.0 | 2.3 | 471.0 | 2:1 | 4 | 150 | Do. |
| 3d | 7b | 247 | B | 11.0 | 1.2 | 258.0 | 2:1 | 3 | 145 | Do. |
| 4d | 10b | 609 | B | 11.0 | 3.1 | 620.0 | 2:1 | 5 | 155 | Do. |
| 5d | 2c | 249 | B | 11.0 | 1.3 | 260 | 2:1 | 3 | 142 | Do. |
| 6d | 3c | 402 | B | 11.0 | 2.0 | 413 | 2:1 | 4 | 150 | Do. |
| 7d | 5c | 708 | B | 11.0 | 3.5 | 719 | 2:1 | 5 | 155 | Do. |
| 8d | 2d | 192 | B | 11.0 | 1.0 | 203 | 2:1 | 3 | 148 | Do. |
| 9d | 3d | 319 | B | 11.0 | 1.6 | 330 | 2:1 | 3 | 150 | Do. |
| 10d | 6d | 249 | B | 1.1 | 1.2 | 250 | 2:1 | 3 | 150 | Do. |

TABLE VII

| Ex. No. | Oxyalkylated resin used | Probable molecular wt. of reaction product | Amount of product, grams | Amount of solvent, grams |
|---|---|---|---|---|
| 1 | 2b | 4,710 | 4,710 | 2,355 |
| 2 | 4b | 9,570 | 4,785 | 2,390 |
| 3 | 7b | 5,310 | 5,310 | 2,655 |
| 4 | 10b | 12,550 | 6,275 | 3,128 |
| 5 | 2c | 5,350 | 5,350 | 2,675 |
| 6 | 3c | 8,410 | 4,200 | 2,100 |
| 7 | 5c | 14,530 | 7,265 | 3,632 |
| 8 | 2d | 4,210 | 4,210 | 2,100 |
| 9 | 3d | 6,750 | 6,750 | 3,375 |
| 10 | 6d | 50,190 | 5,020 | 2,510 |
| 1 | 2b | 4,560 | 4,560 | 2,280 |
| 2 | 4b | 9,420 | 4,710 | 2,355 |
| 3 | 7b | 5,160 | 5,150 | 2,570 |
| 4 | 10b | 12,400 | 6,200 | 3,100 |
| 5 | 2c | 5,200 | 5,200 | 2,600 |
| 6 | 3c | 8,260 | 4,130 | 2,065 |
| 7 | 5c | 14,380 | 7,190 | 3,590 |
| 8 | 2d | 4,060 | 4,060 | 2,030 |
| 9 | 3d | 6,600 | 6,600 | 3,300 |
| 10 | 6d | 50,040 | 5,000 | 2,500 | mulsifying agent is used in the conventional way, well known to the art, described, for example, in Patent 2,626,929, dated January 27, 1953, Part 3, and reference is made thereto for a description of conventional procedures of demulsifying, including batch, continuous, and down-the-hole demulsification, the process essentially involving introducing a small amount of demulsifier into a large amount of emulsion with adequate admixture with or without the application of heat, and allowing the mixture to stratify.

Having thus described our invention, what we claim as new and desire to secure by Letters Patent, is:

1. A process for breaking petroleum emulsions of the water-in-oil type, characterized by subjecting the emulsion to the action of a demulsifier including synthetic hydrophile products; said synthetic hydrophile products being the reaction products of (A) an oxyalkylated phenol-aldehyde resin containing a plurality of active hydrogen atoms, and (B) a non-aryl hydrophile polyepoxide characterized by the fact that the precursory polyhydric alcohol, in which an oxygen-linked hydrogen atom is replaced subsequently by the radical

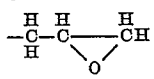

in the polyepoxide, is water-soluble; said polyepoxides being free from reactive functional groups other than epoxy and hydroxyl groups and characterized by the fact that the divalent linkage uniting the terminal oxirane rings is free from any radical having more than 4 uninterrupted carbon atoms in a single chain; said oxyalkylated phenol-aldehyde resins, reactant (A) being the products derived by oxyalkylation involving (aa) an alpha-beta alkylene oxide having not more than 4 carbon atoms and selected from the class consisting of ethylene oxide, propylene oxide, butylene oxide, glycide, and methylglycide, and (bb) an oxyalkylation-susceptible fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula

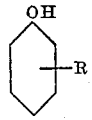

in which R is a hydrocarbon radical having not more than 24 carbon atoms and substituted in the 2,4,6 position; said oxyalkylated resin being characterized by the introduction into the resin molecule of a plurality of divalent radicals having the formula $(R_1O)n$, in which $R_1$ is a member selected from the class consisting of ethylene radicals, propylene radicals, hydroxypropylene radicals, and hydroxybutylene radicals, and $n$ is a numeral varying from 1 to 120; with the proviso that at least 2 moles of alkylene oxide be introduced for each phenolic nucleus, and that the resin by weight represent at least 2% of the oxyalkylated derivative; the ratio of reactant (A) to reactant (B) being in the proportion of two moles of (A) to one mole of (B); with the further proviso that said reactive compounds (A) and (B) be members of the class consisting of non-thermosetting organic solvent-soluble liquids and low-melting solids; with the final proviso that the reaction product be a member of the class of solvent-soluble liquids and low-melting solids; and said reaction between (A) and (B) being conducted below the pyrolytic point of the reactants and the resultants of reaction.

2. A process for breaking petroleum emulsions of the water-in-oil type, characterized by subjecting the emulsion to the action of a demulsifier including synthetic hydrophile products; said synthetic hydrophile products being the reaction products of (A) an oxyalkylated phenol-aldehyde resin containing a plurality of active hydrogen atoms, and (B) a non-aryl hydrophile polyepoxide characterized by the fact that the precursory polyhydric alcohol, in which an oxygen-linked hydrogen atom is replaced subsequently by the radical

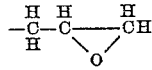

in the polyepoxide, is water-soluble; said polyepoxides being free from reactive functional groups other than epoxy and hydroxyl groups and characterized by the fact that the divalent linkage uniting the terminal oxirane rings is free from any radical having more than 4 uninterrupted carbon atoms in a single chain; said polyepoxides being characterized by having present not more than 20 carbon atoms; said oxyalkylated phenol-aldehyde, resins reactant (A) being the products derived by oxyalkylation involving (aa) an alpha-beta alkylene oxide having not more than 4 carbon atoms and selected from the class consisting of ethylene oxide, propylene oxide, butylene oxide, glycide, and methylglycide, and (bb) an oxyalkylation-susceptible fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula

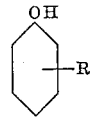

in which R is a hydrocarbon radical having not more than 24 carbon atoms and substituted in the 2,4,6 position; said oxyalkylated resin being characterized by the introduction into the resin molecule of a plurality of divalent radicals having the formula $(R_1O)n$, in which $R_1$ is a member selected from the class consisting of ethylene radicals, propylene radicals, hydroxypropylene radicals, and hydroxybutylene radicals, and $n$ is a numeral varying from 1 to 120; with the proviso that at least 2 moles of alkylene oxide be introduced for each phenolic nucleus, and that the resin by weight represent at least 2% of the oxyalkylated derivative; the ratio of reactant (A) to reactant (B) being in the proportion of two moles of (A) to one mole of (B); with the further proviso that said reactive compounds (A) and (B) be members of the class consisting of non-thermosetting organic solvent-soluble liquids and low-melting solids; with the final proviso that the reaction product be a member of the class of solvent-soluble liquids and low-melting solids; and said reaction between (A) and (B) being conducted below the pyrolytic point of the reactants and the resultants of reaction.

3. A process for breaking petroleum emulsions of the water-in-oil type, characterized by subjecting the emulsion to the action of a demulsifier including synthetic hydrophile products; said synthetic hydrophile products being the reaction products of (A) an oxyalkylated phenol-aldehyde resin containing a plurality of active hydrogen atoms, and (B) a non-aryl hydrophile diepoxide characterized by the fact that the precursory polyhydric alcohol, in which an oxygen-linked hydrogen atom is replaced subsequently by the radical

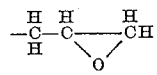

in the diepoxide, is water-soluble; said diepoxides being free from reactive functional groups other than epoxy and hydroxyl groups and characterized by the fact that the divalent linkage uniting the terminal oxirane rings is free from any radical having more than 4 uninterrupted carbon atoms in a single chain; said diepoxides being characterized by having present not more than 20 carbon atoms; said oxyalkylated phenol-aldehyde, resins reactant (A) being the products derived by oxyalkylation involving (aa) an alpha-beta alkylene oxide having not more than 4 carbon atoms and selected from the class consisting of ethylene oxide, propylene oxide, butylene oxide, glycide, and methylglycide, and (bb) an oxyalkylation-susceptible, fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula

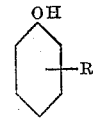

in which R is a hydrocarbon radical having not more than 24 carbon atoms and substituted in the 2,4,6 position; said oxyalkylated resin being characterized by the introduction into the resin molecule of a plurality of divalent radicals having the formula $(R_1O)_n$, in which $R_1$ is a member selected from the class consisting of ethylene radicals, propylene radicals, hydroxypropylene radicals, and hydroxybutylene radicals, and $n$ is a numeral varying from 1 to 120; with the proviso that at least 2 moles of alkylene oxide be introduced for each phenolic nucleus, and that the resin by weight represented at least 2% of the oxyalkylated derivative; the ratio of reactant (A) to reactant (B) being in the proportion of two moles of (A) to one mole of (B); with the further proviso that said reactive compounds (A) and (B) be members of the class consisting of non-thermosetting organic solvent-soluble liquids and low-melting solids; with the final proviso that the reaction product be a member of the class of solvent-soluble liquids and low-melting solids; and said reaction between (A) and (B) being conducted below the pyrolytic point of the reactants and the resultants of reaction.

4. The process of claim 3 wherein the diepoxide contains at least one reactive hydroxyl radical.

5. A process for breaking petroleum emulsions of the water-in-oil type, characterized by subjecting the emulsion to the action of a demulsifier including synthetic hydrophile products; said synthetic hydrophile products being the reaction products of (A) an oxyalkylated phenol-aldehyde resin containing a plurality of active hydrogen atoms, and (B) a hydroxylated diepoxy polyglycerol having not over 20 carbon atoms; said oxyalkylated phenol-aldehyde resin, reactant (A) being the product derived by oxyalkylation involving (aa) an alpha-beta alkylene oxide having not more than 4 carbon atoms and selected from the class consisting of ethylene oxide, propylene oxide, butylene oxide, glycide, and methylglycide, and (bb) an oxyalkylation-susceptible, fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula

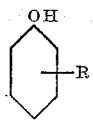

in which R is a hydrocarbon radical having not more than 24 carbon atoms and substituted in the 2,4,6 position; said oxyalkylated resin being characterized by the introduction into the resin molecule of a plurality of divalent radicals having the formula $(R_1O)_n$, in which $R_1$ is a member selected from the class consisting of ethylene radicals, propylene radicals, hydroxypropylene radicals, and hydroxybutylene radicals, and $n$ is a numeral varying from 1 to 120; with the proviso that at least 2 moles of alkylene oxide be introduced for each phenolic nucleus, and that the resin by weight represent at least 2% of the oxyalkylated derivative; the ratio of reactant (A) to reactant (B) being in the proportion of two moles of (A) to one mole of (B); with the further proviso that said reactive compounds (A) and (B) be members of the class consisting of non-thermosetting organic solvent-soluble liquids and low-melting solids; with the final proviso that the reaction product be a member of the class of solvent-soluble liquids and low-melting solids; and said reaction between (A) and (B) being conducted below the pyrolytic point of the reactants and the resultants of reaction.

6. The process of claim 5 wherein the polyglycerol derivative has not over 8 glycerol nuclei.

7. The process of claim 5 wherein the polyglycerol derivative has not over 5 glycerol nuclei, and the precursory phenol is para-substituted.

8. The process of claim 5 wherein the polyglycerol derivative has not over 5 glycerol nuclei, and the precursory phenol is para-substituted and contains at least 4 and not over 18 carbon atoms in the substituent group.

9. The process of claim 5 wherein the polyglycerol derivative has not over 5 glycerol nuclei, and the precursory phenol is para-substituted and contains at least 4 and not over 14 carbon atoms in the substituent group, and the precursory aldehyde is formaldehyde.

10. The process of claim 5 wherein the polyglycerol derivative has not over 5 glycerol nuclei, and the precursory phenol is para-substituted and contains at least 4 and not over 14 carbon atoms in the substituent group, and the precursory aldehyde is formaldehyde, and the total number of phenolic nuclei in the initial resin is not over 5.

11. The process of claim 1 with the proviso that the hydrophile properties of the polyepoxide-derived product in an equal weight of xylene, are sufficient to produce an emulsion when said xylene solution is shaken vigorously with 1 to 3 volumes of water.

12. The process of claim 2 with the proviso that the hydrophile properties of the polyepoxide-derived product in an equal weight of xylene, are sufficient to produce an emulsion when said xylene solution is shaken vigorously with 1 to 3 volumes of water.

13. The process of claim 3 with the proviso that the hydrophile properties of the polyepoxide-derived product in an equal weight of xylene, are sufficient to produce an emulsion when said xylene solution is shaken vigorously with 1 to 3 volumes of water.

14. The process of claim 4 with the proviso that the hydrophile properties of the polyepoxide-derived product in an equal weight of xylene, are sufficient to produce an emulsion when said xylene solution is shaken vigorously with 1 to 3 volumes of water.

15. The process of claim 5 with the proviso that the hydrophile properties of the polyepoxide-derived product in an equal weight of xylene, are sufficient to produce an emulsion when said xylene solution is shaken vigorously with 1 to 3 volumes of water.

16. The process of claim 6 with the proviso that the hydrophile properties of the polyepoxide-derived product in an equal weight of xylene, are sufficient to produce an emulsion when said xylene solution is shaken vigorously with 1 to 3 volumes of water.

17. The process of claim 7 with the proviso that the hydrophile properties of the polyepoxide-derived product in an equal weight of xylene, are sufficient to produce an emulsion when said xylene solution is shaken vigorously with 1 to 3 volumes of water.

18. The process of claim 8 with the proviso that the hydrophile properties of the polyepoxide-derived product in an equal weight of xylene, are sufficient to produce an emulsion when said xylene solution is shaken vigorously with 1 to 3 volumes of water.

19. The process of claim 9 with the proviso that the hydrophile properties of the polyepoxide-derived product in an equal weight of xylene, are sufficient to produce an emulsion when said xylene solution is shaken vigorously with 1 to 3 volumes of water.

20. The process of claim 10 with the proviso that the hydrophile properties of the polyepoxide-derived product in an equal weight of xylene, are sufficient to produce an emulsion when said xylene solution is shaken vigorously with 1 to 3 volumes of water.

References Cited in the file of this patent

UNITED STATES PATENTS

| Number | Name | Date |
|---|---|---|
| 2,317,726 | Boedeker et al. | Apr. 27, 1943 |
| 2,395,739 | Hersberger | Feb. 26, 1946 |
| 2,454,541 | Bock et al. | Nov. 23, 1948 |
| 2,499,365 | De Groote | Mar. 7, 1950 |
| 2,507,910 | Keiser et al. | May 16, 1950 |
| 2,602,052 | De Groote | July 1, 1952 |